US010712805B2

(12) United States Patent
Woo et al.

(10) Patent No.: US 10,712,805 B2
(45) Date of Patent: Jul. 14, 2020

(54) SYSTEM AND METHOD OF THERMAL MANAGEMENT OF INFORMATION HANDLING SYSTEMS

(71) Applicant: Dell Products L.P., Round Rock, TX (US)

(72) Inventors: Joohyun Woo, Round Rock, TX (US); Travis Christian North, Cedar Park, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 15/911,879

(22) Filed: Mar. 5, 2018

(65) Prior Publication Data
US 2019/0272020 A1 Sep. 5, 2019

(51) Int. Cl.
G06F 1/26 (2006.01)
G06F 1/3234 (2019.01)
G06F 1/3231 (2019.01)
G06F 3/041 (2006.01)
G06F 1/16 (2006.01)
G06F 1/3203 (2019.01)

(52) U.S. Cl.
CPC .......... G06F 1/3265 (2013.01); G06F 1/1643 (2013.01); G06F 1/3231 (2013.01); G06F 3/0412 (2013.01); G06F 1/1649 (2013.01); G06F 1/3203 (2013.01)

(58) Field of Classification Search
CPC .... G06F 1/3265; G06F 1/1643; G06F 3/0412; G06F 1/3231; G06F 1/1649

USPC ......................................................... 713/323
See application file for complete search history.

(56) References Cited

U.S. PATENT DOCUMENTS

| 9,606,664 B2 | 3/2017 | Knepper et al. | |
| 2002/0080132 A1* | 6/2002 | Dai ...................... | G06F 1/3203 345/212 |
| 2002/0175658 A1 | 11/2002 | Watts et al. | |
| 2004/0075622 A1* | 4/2004 | Shiuan ................... | G06F 3/1431 345/1.1 |
| 2004/0257089 A1 | 12/2004 | Aridome | |
| 2011/0143769 A1* | 6/2011 | Jones ..................... | G06F 1/1624 455/456.1 |
| 2012/0176080 A1 | 7/2012 | Uchihashi et al. | |
| 2013/0076672 A1* | 3/2013 | Sirpal ................... | G06F 3/1438 345/173 |

(Continued)

Primary Examiner — Volvick Derose
(74) Attorney, Agent, or Firm — Baker Botts L.L.P.

(57) ABSTRACT

In one or more embodiments, one or more systems, methods, and/or processes may determine if a user is in contact with an information handling system. If the user is not in contact with the information handling system, the information handling system may utilize a thermal profile. If the user is in contact with the information handling system, it may be determined if the user is in contact with a first display of multiple displays of the information handling system. If the user is in contact with the first display, processing of information may be migrated from a component associated with the first display to a component associated with a second display of the multiple displays. If the user is not in contact with the first display, processing of the information may be migrated from the component associated with the second display to the component associated with the first display.

20 Claims, 15 Drawing Sheets

(56) References Cited

U.S. PATENT DOCUMENTS

| | | | | |
|---|---|---|---|---|
| 2015/0130725 A1* | 5/2015 | Knepper | ............... | G06F 1/1643 |
| | | | | 345/173 |
| 2016/0265977 A1* | 9/2016 | Parvarandeh | ............. | G01J 5/12 |
| 2016/0342258 A1* | 11/2016 | Han | ......................... | G06F 3/033 |
| 2016/0372088 A1* | 12/2016 | Dow | ......................... | G09G 5/38 |
| 2018/0252774 A1 | 9/2018 | Ciaccio et al. | | |

* cited by examiner

SYSTEM AND METHOD OF THERMAL MANAGEMENT OF INFORMATION HANDLING SYSTEMS

BACKGROUND

Field of the Disclosure

This disclosure relates generally to information handling systems and more particularly to thermal management of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Furthermore, information handling systems can have two or more displays with one or more display screens for output of images, text, etc. and for input such as by touch screen operation and/or active stylus input.

SUMMARY

In one or more embodiments, one or more systems, methods, and/or processes may determine if a user is in contact with an information handling system. If the user is not in contact with the information handling system, the information handling system may utilize a first thermal profile. If the user is in contact with the information handling system, it may be determined if the user is in contact with a first display of multiple displays of the information handling system. If the user is in contact with the first display, processing of information may be migrated from a component associated with the first display to a component associated with a second display of the multiple displays. If the user is not in contact with the first display, processing of the information may be migrated from the component associated with the second display to the component associated with the first display. In one or more embodiments, the information handling system may include a graphics processing unit and at least one processor. In one example, the component associated with the first display may include the at least one processor, and the component associated with the second display includes the graphics processing unit. In another example, the component associated with the first display may include the graphics processing unit, and the component associated with the second display includes the at least one processor. In one or more embodiments, the graphics processing unit may be a discrete graphics processing unit, separate from the at least one processor.

In one or more embodiments, the one or more systems, methods, and/or processes may boost power to the component associated with the first display if the user is not in contact with the first display. In one example, boosting power to the component associated with the first display may include configuring the component associated with the first display to process additional data per time unit. In a second example, boosting power to the component associated with the first display may include permitting, allowing, and/or configuring the component associated with the first display to produce more heat. In a third example, boosting power to the component associated with the first display may include permitting, allowing, and/or configuring the component associated with the first display to utilize a faster clock speed. In another example, boosting power to the component associated with the first display may include permitting, allowing, and/or configuring the component associated with the first display to utilize superscalar processing or additional superscalar processing. In one or more embodiments, the information handling system may utilize a second thermal profile, if the user is in contact with the first display. For example, it may be determined that the user is in contact with the first display and the second display. In one or more embodiments, multiple pixels, proximate to the contact with at least one of the first display and the second display, may be deactivated. For example, the multiple pixels, proximate to the contact with at least one of the first display and the second display, may be deactivated in response to determining that the user is in contact with the first display and the second display.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
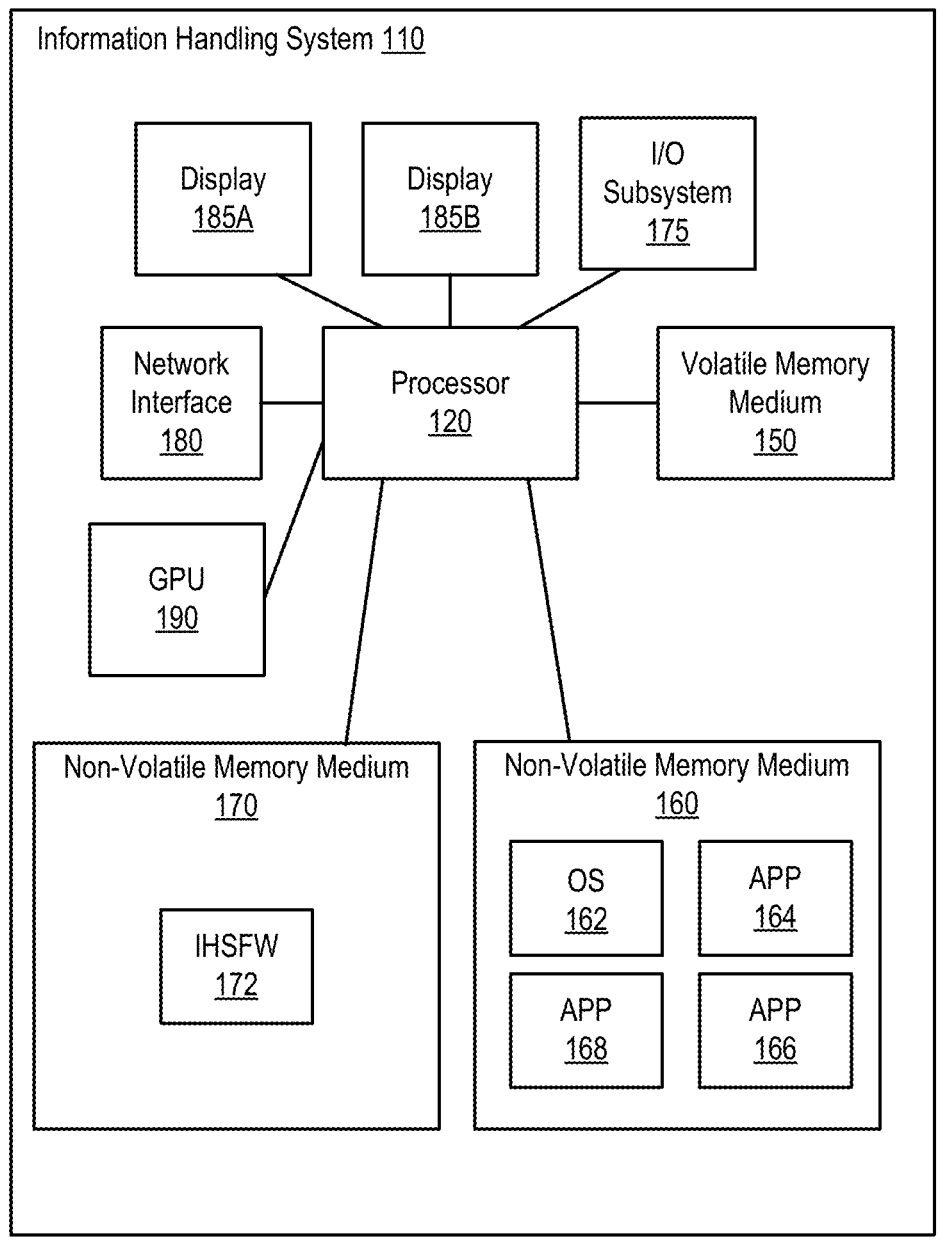
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more thermal specifications may be utilized in determining a temperature that is appropriate for a surface of information handling system that may contact a user. In one example, a maximum temperature for a glass portion of the information handling system that may contact the user may be twenty-two degrees Celsius (22° C.) above an ambient temperature. For instance, an ambient temperature may be or may be around twenty-eight degrees Celsius (28° C.). In a second example, a maximum temperature for a metallic portion of the information handling system that may contact the user may be eleven degrees Celsius (11° C.) above an ambient temperature. For instance, an ambient temperature may be or may be around twenty-eight degrees Celsius (28° C.). In another example, a maximum temperature for a plastic portion of the information handling system that may contact the user may be twelve degrees Celsius (12° C.) above an ambient temperature. For instance, an ambient temperature may be or may be around twenty-eight degrees Celsius (28° C.).

In one or more embodiments, a user may rest a portion of his or her body against an information handling system when utilizing the information handling system. In one example, the user may rest one or more of a hand, a palm of the hand, and one or more fingers of the hand against the information handling system while interacting with the information handling system. In another example, the user may rest a forearm against the information handling system while interacting with the information handling system. In one or more embodiments, an information handling system may include one or more displays. For example, the user may contact a portion of his or her body with the one or more displays of the information handling system. For instance, a surface of a display of the information handling system may include one or more of glass and plastic, and if one or more temperatures of the surface, contacting the user, are not below a threshold temperature, a user experience may be less than optimal or may be a poor user experience. In one or more embodiments, controlling one or more temperatures of one or more portions of an information handling system that may contact a user of the information handling system may provide one or more advantages. For example, the one or more advantages may include one or more of a good user experience, faster processing of information, and better utilization of multiple displays, among others.

In one or more embodiments, controlling one or more temperatures of one or more portions of an information handling system may include distributing one or more of power and processing through the information handling system. In one example, processing may be migrated from a first portion of the information handling system to a second portion, different from the first portion, of the information handling system. For instance, processing may be migrated from a first component of the information handling system to a second component, different from the first component, of the information handling system. In another example, power transmission may be migrated from a first portion of the information handling system to a second portion, different from the first portion, of the information handling system. For instance, power transmission may be migrated from a first power supply of the information handling system to a second power supply, different from the first supply, of the information handling system.

In one or more embodiments, distributing one or more of power and processing through the information handling system may include determining how the information handling system is being utilized. For example, determining how the information handling system is being utilized may include determining one or more applications (e.g., one or more of a drawing application, an image processing application, a word processing application, a computer-aided design (CAD) application, a mathematics application (e.g., Mathematica, MathCAD, etc.), a video processing application, and a sound processing application, among others) that are executing and/or being utilized by the user. In one instance, the information handling system may determine if an on-screen keyboard is being utilized by the user. In a second instance, the information handling system may determine if an external mouse and/or keyboard is communicatively coupled to the information handling system. In a third instance, the information handling system may determine an orientation of the information handling system and/or one or more orientation of one or more displays of the information handling system. In another instance, the information handling system may determine if a stylus is utilized by the user. In one or more embodiments, the information handling system may determine an operating mode of the information handling system. For example, an operating mode of the information handling system may include a laptop mode (e.g., one display that outputs information from an application and another display that receives user input, such as a keyboard), a dual screen on a dock (e.g., multiple displays coupled to a docking station and/or at an angle), dual display on a surface (e.g., multiple displays are "face up" on a table/desk/etc.).

In one or more embodiments, the information handling system may determine one or more modes, methods, and/or processes in controlling and/or handling thermal aspects, processing distribution, and/or power distribution based at least on various determinations described herein. In one or more embodiments, the information handling system may adjust, control, and/or handle one or more thermal aspects of the information handling system based at least on a portion of a user in contact with the information handling system. In one example, processing may be migrated from a first portion of the information handling system to a second portion, different from the first portion, of the information handling system. For instance, with an information handling system that includes multiple displays, processing may be migrated from a first processor associated with a first display of the multiple displays to a second processor associated with a second display of the multiple displays. In another example, processing may be boosted. In one or more embodiments, if processing was migrated from a first portion of the information handling system to a second portion, different from the first portion, of the information handling system, processing may be migrated back to the first portion of the information handling system. In one or more embodiments, if processing was migrated from a first portion of the information handling system to a second portion, different from the first portion, of the information handling system, processing may be augmented by the first portion of the information handling system.

In one or more embodiments, processing may be boosted based on an application classification. For example, an application classification may include applications that are graphics processing unit intensive. In one instance, one or more applications that may be graphics processing unit intensive may include one or more of an image processing application, a CAD application, a computational fluid dynamics (CFD) application, a gaming application, a video processing application, and a sound processing application, among others. In another instance, one or more applications that may be graphics processing unit intensive may utilize a measurable amount of graphics processing unit white space. In one or more embodiments, boosting processing may include one or more of permitting, allowing, and/or configuring a component (e.g., a component associated with a display), to produce more heat; permitting, allowing, and/or configuring the component to process additional data per time unit; permitting, allowing, and/or configuring the component to utilize a faster clock speed; and permitting, allowing, and/or configuring the component to utilize superscalar processing or additional superscalar processing, among others. In one or more embodiments, a lookup table may include a list of application names and/or application identification that may be associated with application classifications. For example, a database may store the lookup table.

In one or more embodiments, an application classification may be utilized in determining a display, of multiple displays, to display output of an application. For example, the information handling system may determine to display output of an application via a first display and process information via one or more components associated with a second display. In one or more embodiments, one or more components associated with the second display may be boosted. For example, a user may interact with the application via the first display. In one instance, one or more temperatures associated with the second display and/or one or more components associated with the second display may be allowed and/or permitted to increase, as the user may interact and/or contact the first display. In another instance, one or more temperatures associated with the first display and/or one or more components associated with the first display may be allowed and/or permitted to increase, as the user may not interact and/or contact the first display.

In one or more embodiments, an information handling system may include multiple displays. In one example, a processor (e.g., a central processing unit or "CPU") may be included in a first housing that includes a first display of the multiple displays. In another example, a discrete graphics processing unit may be included in a second housing that includes a second display of the multiple displays. In one or more embodiments, processing of information may be migrated between the processor and the discrete graphics processing unit. For example, processing of information may be migrated between the processor and the discrete graphics processing unit based at least on where a user contacts the information handling system. In one instance, the user may contact the information handling system via the first display, and processing of information may be migrated from the processor to the discrete graphics processing unit in response to the user contacting the first display. In a second instance, the user may contact the information handling system via the second display, and processing of information may be migrated from the discrete graphics processing unit to the processor it in response to the user contacting the second display.

In one or more embodiments, an information handling system may include multiple displays. In one example, a processor may be included in a first housing that includes a first display of the multiple displays. In another example, a battery may be included in a second housing that includes a second display of the multiple displays. In one or more embodiments, different processor power settings may be utilized when a user is in contact with the first display. For example, the different processor power settings the may be utilized when the user is in contact with the first display may be lower power settings than when the user is contact with the second display. For instance, the battery of the second housing, that includes the second display, may insulate the user from heat of the processor, permitting and/or allowing the processor to utilize greater power settings, which may improve and/or boost performance of processing information. In one or more embodiments, an information handling system may inform a user with information associated with performance of the information handling system. For example, the information handling system may display information to the user that indicates how to improve performance of the information handling system. In one instance, the information handling system may display information that informs the user to use the second display (e.g., a battery side) as keyboard, when the information handling system is in a laptop mode. In another instance, the information handling system may display information that informs the user to rest the second display (e.g., a battery side) on a palm or lap of the user, when the information handling system is in a "360" degree mode.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, displays 185A and 185B, and a graphics processing unit (GPU) 190. In one or more embodiments, GPU 190 may be or include a discrete GPU (dGPU). As illustrated, volatile memory medium 150, non-volatile memory media 160 and 170, I/O subsystem 175, network interface 180, displays 185A and 185B, and GPU 190 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
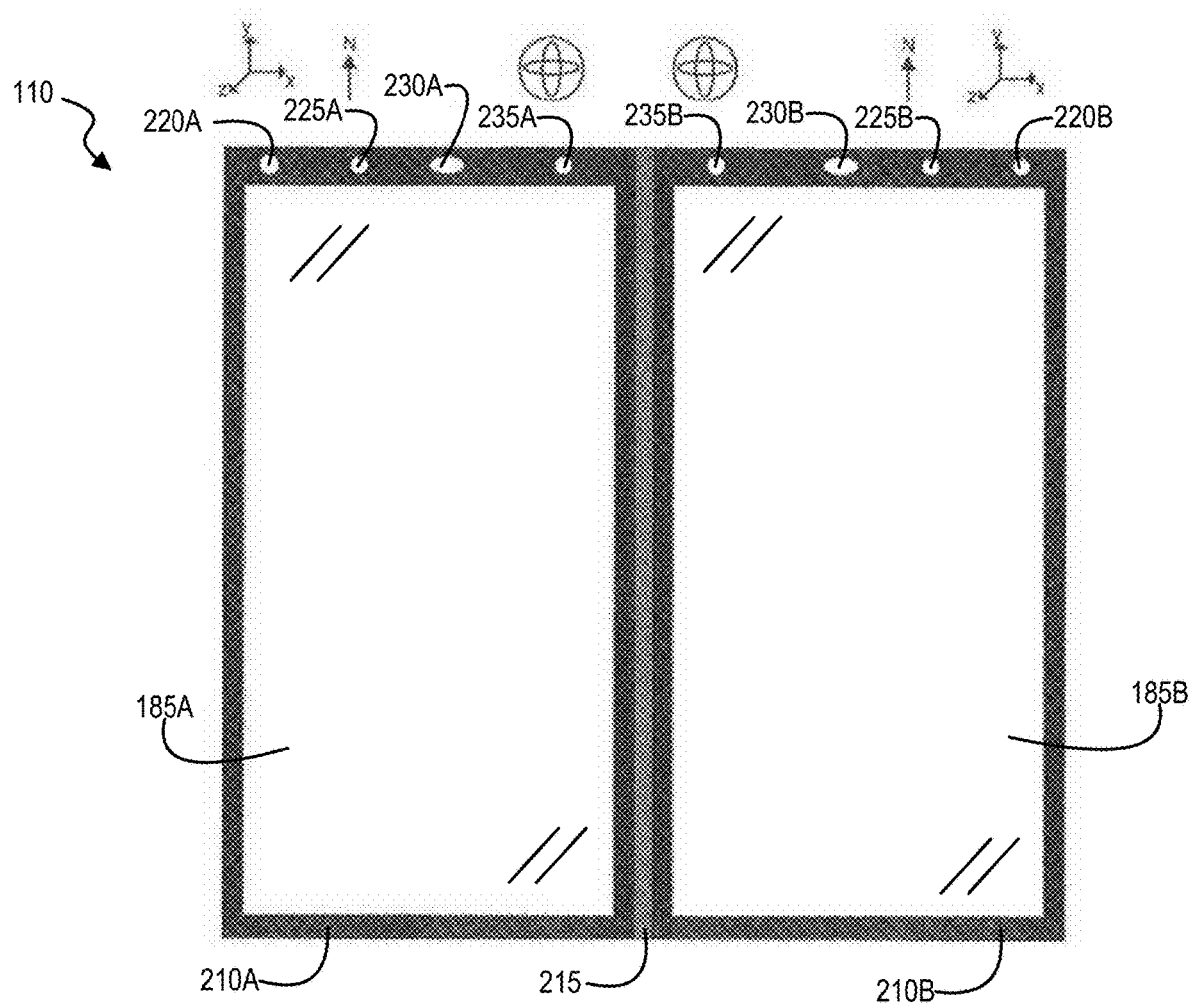
FIG. 2A illustrates an example of an information handling system that includes multiple displays, according to one or more embodiments.

Turning now to FIG. 2A, an example of an information handling system that includes multiple displays is illustrated, according to one or more embodiments. As shown, IHS 110 may include housings 210A and 210B. In one or more embodiments, housings 210A and 210B may be joined via a hinge mechanism 215. As illustrated, housing 210A may include one or more of display 185A, an orientation sensor 220A, a directional sensor 225A, a camera 230A, and a gyroscopic sensor 235B. Although not specifically illustrated, one or more of orientation sensor 220A, directional sensor 225A, camera 230A, and gyroscopic sensor 235A may be communicatively coupled to processor 120, according to one or more embodiments.

As shown, housing 210B may include one or more of display 185B, an orientation sensor 220B, a directional sensor 225B, a camera 230B, and a gyroscopic sensor 235B. Although not specifically illustrated, one or more of orientation sensor 220B, directional sensor 225B, camera 230B, and gyroscopic sensor 235B may be communicatively coupled to processor 120, according to one or more embodiments. In one or more embodiments, one or more of housings 210A and 210B may operate to provide information to a user of IHS 110. In one example, display 185A may provide information in association with display 185B. In a second example, display 185A may provide information that is not associated with display 185B. In another example, one of display displays 285A and 285B may provide information while the other display may be blank, as needed and/or desired.

In one or more embodiments, displays 285A and 285B may represent combined input/output devices for IHS 110. For example, displays 285A and 285B may be or include respective touch-screen displays, that operate to display and/or receive information associated with respective housings 210A and 210B. In one or more embodiments, each of one or more of displays 285A and 285B may display a keyboard interface and receive touch-based keyboard inputs. In one or more embodiments, each of one or more of displays 285A and 285B may include a gesture-enabled display device that is configured to detect the motion of a touch over a surface the display. In one or more embodiments, each of one or more of displays 285A and 285B may include a multi-touch-enabled display device that is configured to detect two or more simultaneous touch contacts on the surface of the display. In one or more embodiments, each of one or more of displays 285A and 285B may include a hover-sensitive display device that is configured to detect a presence of a touch device and/or a portion of a user hovering in proximity over the surface of the display.

In one or more embodiments, processor 120 may receive information from one or more of orientation sensors 220A and 220B, directional sensors 225A and 225B, cameras 230A and 230B, and gyroscopic sensors 235A and 235B, among others. In one or more embodiments, one or more of orientation sensors 220A and 220B, directional sensors 225A and 225B, and gyroscopic sensors 235A and 235B, among others, may be utilized in determining an orientation in space of respective housings 210A and 210B, based at least on a three-dimensional coordinate system.

In one example, one or more of orientation sensor 220A, directional sensor 225A, and gyroscopic sensor 235A, among others, may be utilized in determining that housing 210A is oriented horizontally, vertically with a bottom parallel to the ground, vertically with a side parallel to the ground, and/or in an intermediate orientation, among others. In another example, one or more of orientation sensor 220B, directional sensor 225B, and gyroscopic sensor 235B, among others, may be utilized in determining that housing 210B is oriented horizontally, vertically with a bottom parallel to the ground, vertically with a side parallel to the ground, and/or in an intermediate orientation, among others.

In one or more embodiments, one or more of directional sensors 225A and 225B may be configured to determine an orientation with respect to magnetic north of a major axis to one or more of housings 210A and 210B. For example, where housing 210A is oriented horizontally, direction sensor 225A may be utilized in determining a compass bearing of a line oriented along a side of the housing. For instance, one or more of directional sensors 225A and 225B may include one or more magnetometers and/or one or more accelerometers, among others.

In one or more embodiments, one or more of cameras 230A and 230B may be configured to receive photonic input. For example, one or more of cameras 230A and 230B may be utilized to receive light input and provide one or more of still images and/or one or more videos. In one or more embodiments, one or more of cameras 230A and 230B may be utilized in determining motion and/or presence of a pointing device and/or a user in proximity to one or more of housings 210A and 210B, among others. In one or more embodiments, one or more of cameras 230A and 230B may be utilized in determining a direction of a glance of a user of IHS 110. In one example, camera 230A may be utilized in determining if a user is looking at the top-left corner of housing 210A and/or in determining if the user is looking at a bottom-right corner of housing 210A. In another example, one or more of cameras 230A and 230B may be utilized in following a glance of the user, as the glance moves across one or more of housing 210A and 210B.

In one or more embodiments, one or more of gyroscopic sensors 235A and 235B may be utilized in determining a rotational motion of respective housings 210A and 210B and/or in determining one or more rates of rotational motion. In one or more embodiments, hinge mechanism 215 may coupled housings 210A and 210B. For example, hinge mechanism 215 may include a hinge that joins an edge of housing 210A to an edge of housing 210B. In one or more embodiments, hinge mechanism 215 may operate to permit housing 210A to swing to any angle between 0 and 360 degrees of arc with respect to housing 210B. As illustrated, IHS 110 is in an orientation where housing 210A is swung to a 180 degree angle with respect to housing 210B.

Figure 2B:
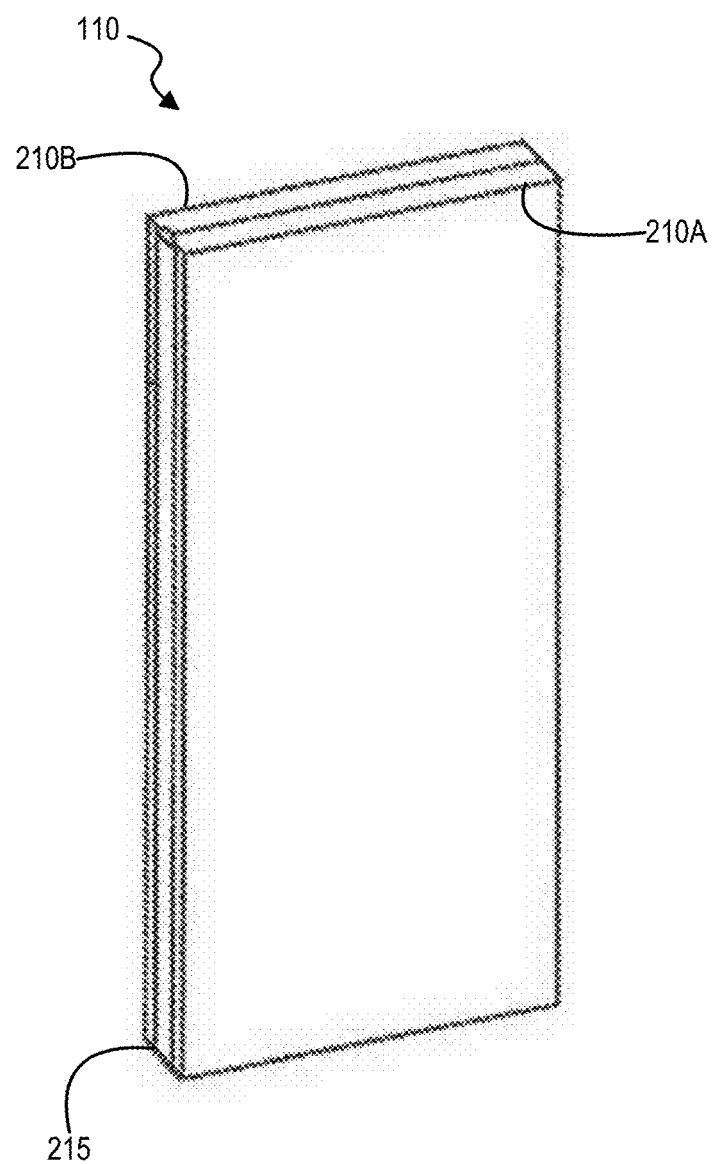
FIG. 2B illustrates an example of an information handling system that includes multiple displays, where an orientation of a first housing is swung to a 0 degree angle with respect to a second housing, according to one or more embodiments.

Turning now to FIG. 2B, an example of an information handling system that includes multiple displays, where an orientation of a first housing is swung to a 0 degree angle with respect to a second housing, is illustrated, according to one or more embodiments. As shown, IHS 110 is in a state that is normally associated as a "closed" state. In one or more embodiments, displays 185A and 185B may be facing each other in the "closed" state.

Figure 2C:
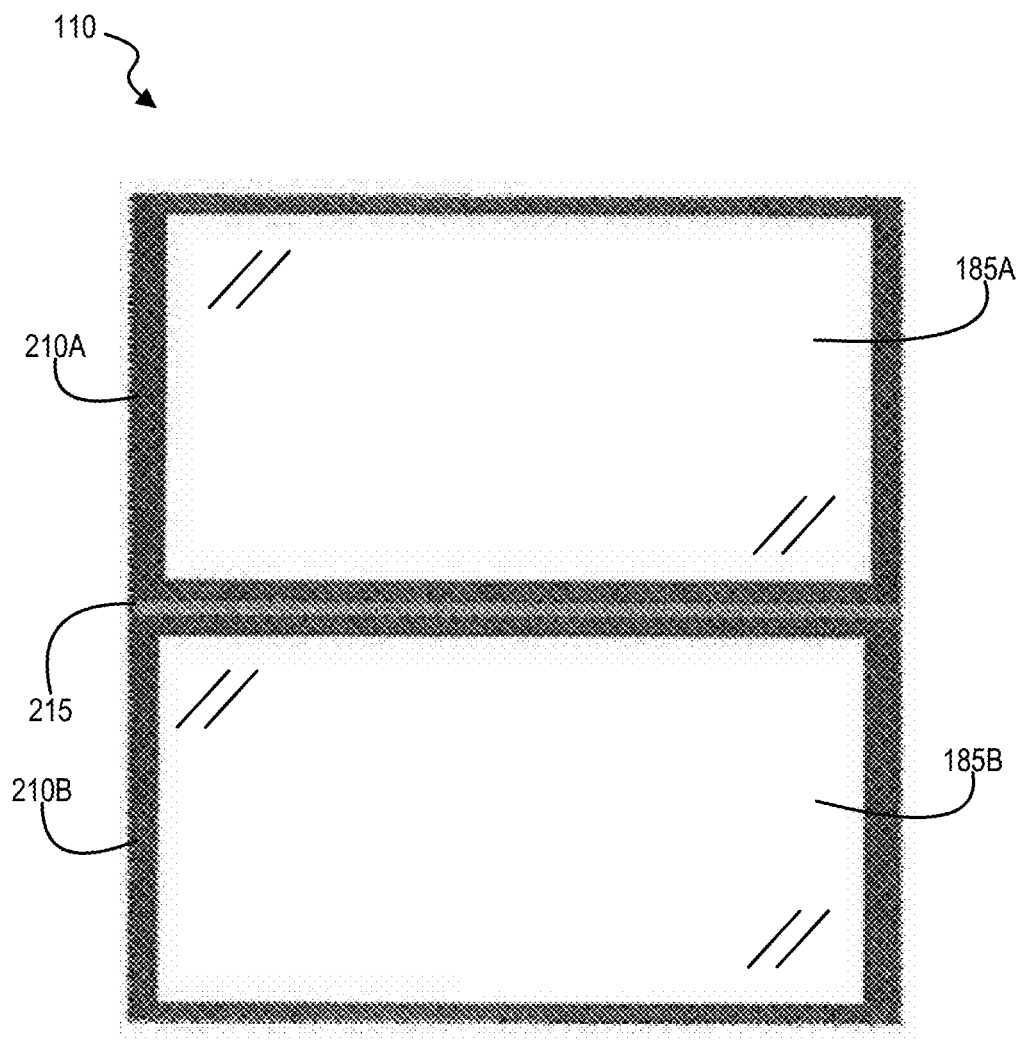
FIGS. 2C and 2D illustrate examples of an information handling system in a landscape orientation and in a portrait orientation, according to one or more embodiments.
Figure 2D:
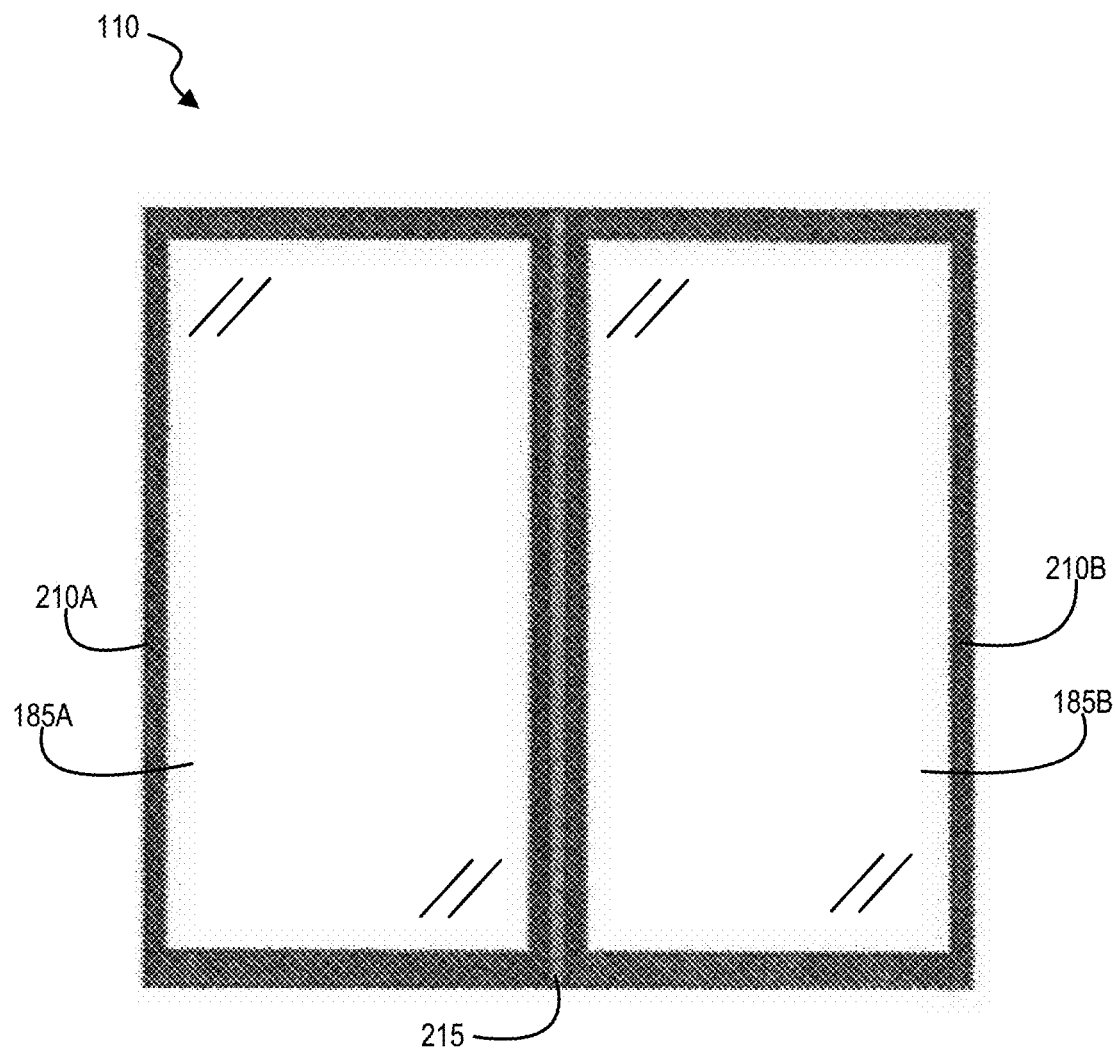

Turning now to FIGS. 2C and 2D, examples of an information handling system in a landscape orientation and in a portrait orientation are illustrated, according to one or more embodiments. As shown in FIG. 2C, IHS 110 may be in a landscape orientation. As illustrated in FIG. 2D, IHS 110 may be in a portrait orientation. In one or more embodiments, the portrait orientation and/or the landscape orientation may be with respect to the ground. In one or more embodiments, the portrait orientation and/or the landscape orientation may be with respect to a user.

Figure 2E:
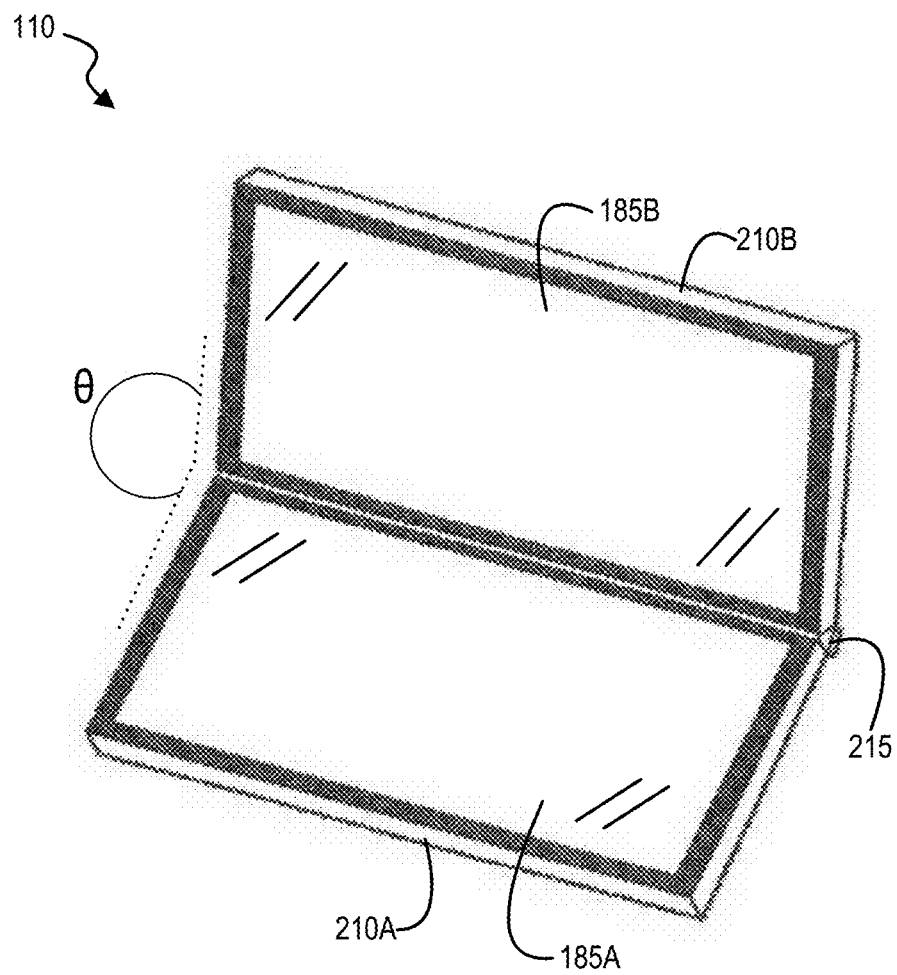
FIG. 2E illustrates an example of an information handling system in a "laptop" mode, according to one or more embodiments.

Turning now to FIG. 2E, an example of an information handling system in a "laptop" mode is illustrated, according to one or more embodiments. As shown, housing 210A may be at an angle θ to housing 210B. For example, θ may be greater than 0 degrees and less than 180 degrees.

Figure 2F:
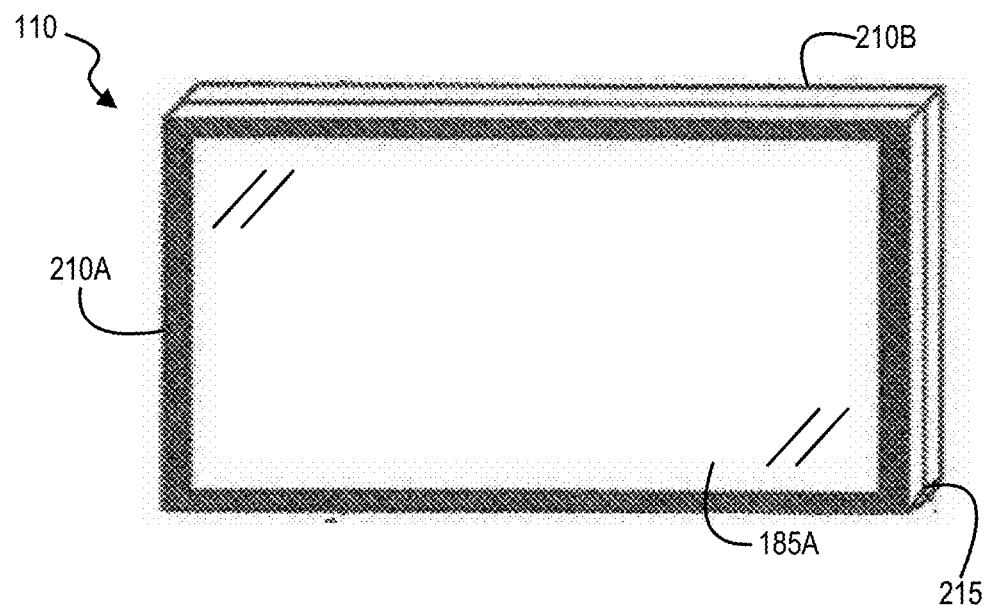
FIGS. 2F and 2G illustrate examples of an information handling system in a "360" degree mode, according to one or more embodiments.
Figure 2G:
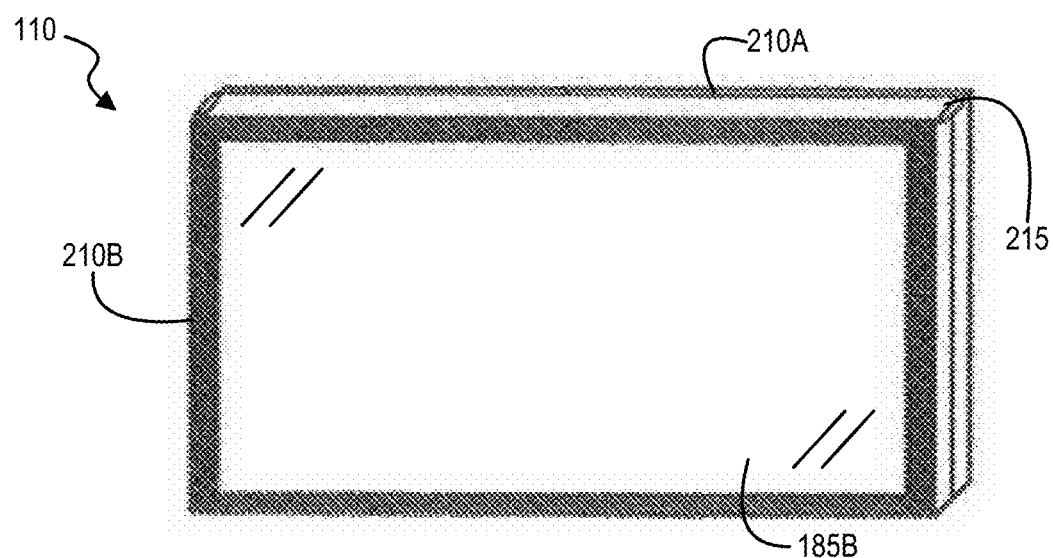

Turning now to FIGS. 2F and 2G, examples of an information handling system in a "360" degree mode are illustrated, according to one or more embodiments. As shown in FIGS. 2F and 2G, IHS 110 may be in a "360" degree mode. In one or more embodiments, the 360 degree mode may be utilized in a dual presentation. In one or more embodiments, the 360 degree mode may be utilized when a user utilizes one display. For example, one of displays 185A and 185B may be utilized, while the other display faces away from the user. For instance, the other display may be laying on a surface, a palm of a user, or a lap of the user, among others.

Figure 2H:
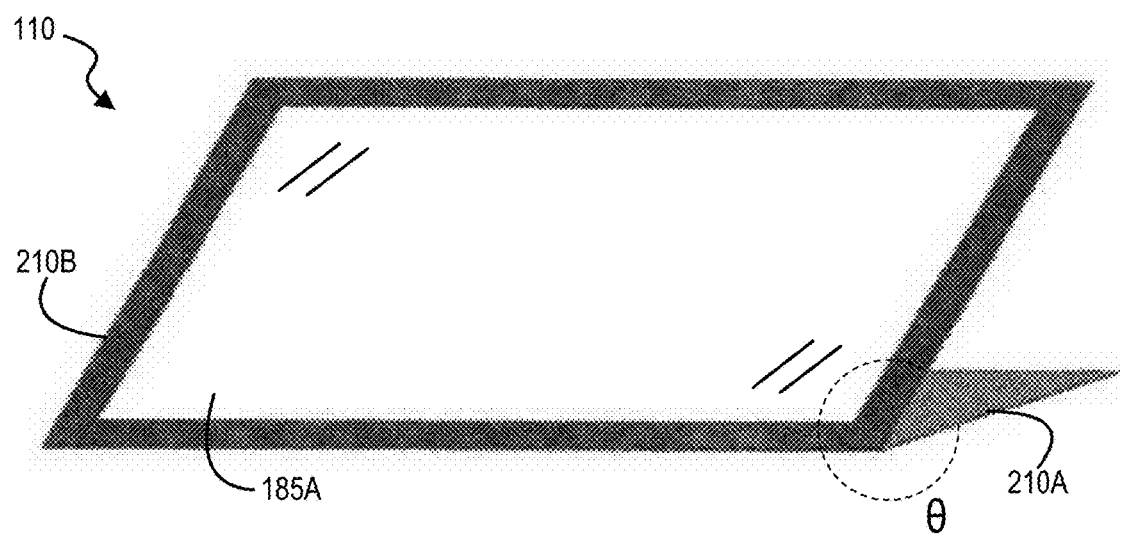
FIGS. 2H and 2I illustrate examples of an information handling system in multiple presentation modes, according to one or more embodiments.
Figure 2I:
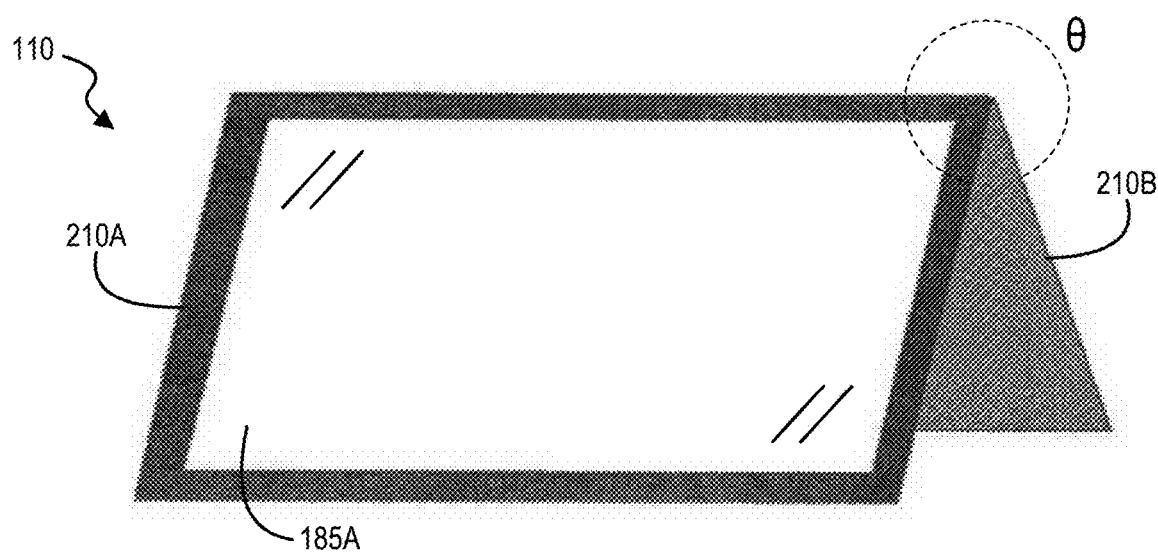

Turning now to FIGS. 2H and 2I, examples of an information handling system in multiple presentation modes are illustrated, according to one or more embodiments. As shown in FIGS. 2H and 2I, housing 210A may be at an angle θ to housing 210B. For example, θ may be greater than 180 degrees and less than 360 degrees. As illustrated, in FIG. 2H, IHS 110 may be in a single presentation mode. As shown in FIG. 2I, IHS 110 may be in a dual presentation mode. For instance, IHS 110 may be "tented".

Figure 2J:
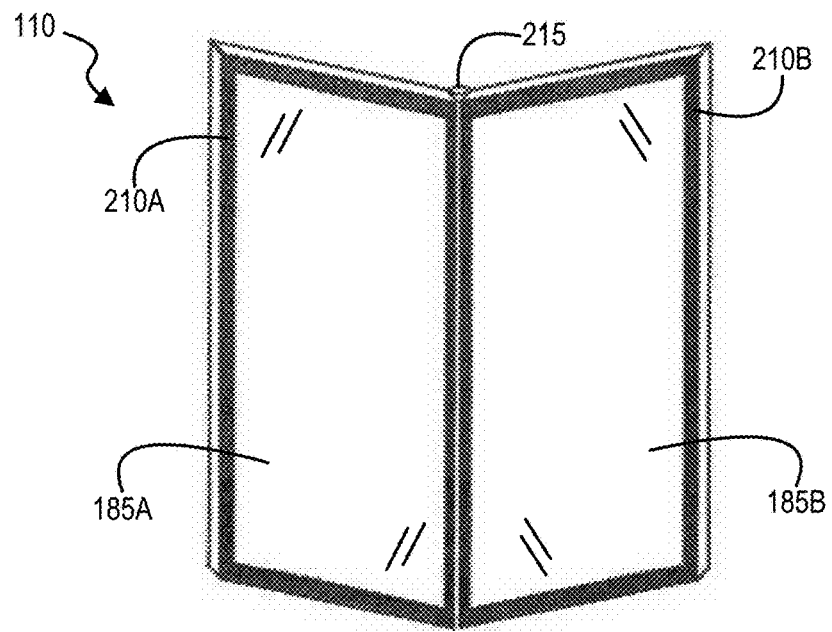
FIGS. 2J and 2K illustrate examples of an information handling system in multiple other presentation modes, according to one or more embodiments.
Figure 2K:
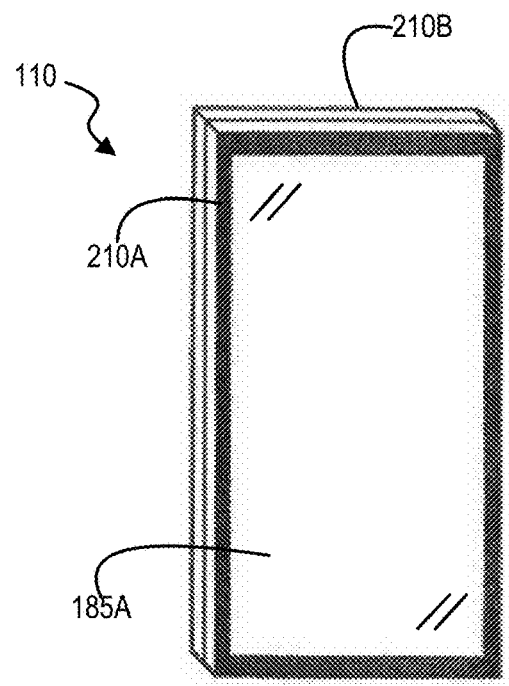

Turning now to FIGS. 2J and 2K, examples of an information handling system in multiple other presentation modes are illustrated, according to one or more embodiments. As shown in FIGS. 2J and 2K, IHS 110 may be in portrait modes. In one example in FIG. 2J, IHS 110 may be in portrait mode in FIG. 2J, and IHS 110 may be in a landscape mode in FIG. 2E. In another example, IHS 110 may be in portrait mode in FIG. 2K, and IHS 110 may be in a landscape mode in FIG. 2F.

Figure 3:
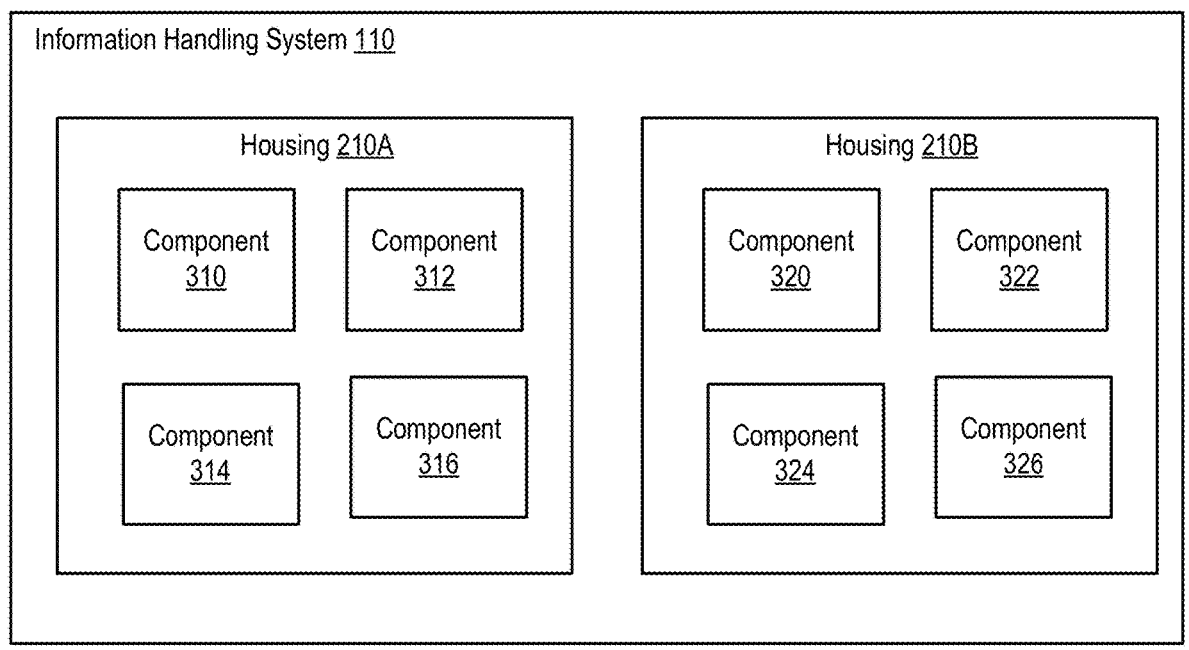
FIG. 3 illustrates an example of an information handling system with multiple components of multiple housings, according to one or more embodiments.

Turning now to FIG. 3, an example of an information handling system with multiple components of multiple housings is illustrated, according to one or more embodiments. As shown, housing 110A may include components 310-316. As illustrated, housing 110B may include components 320-326. In one or more embodiments, housing 110 may include any number of components. In one or more embodiments, a component of components 310-316 may include one or more of IHS elements 120-185, among others. In one or more embodiments, a component of components 320-326 may include one or more of IHS elements 120-185, among others. In one or more embodiments, a component of components 310-316 and/or a component of components 320-326 may include one or more power supplies. For example, a power supply may include one or more of a battery and a capacitor, among others. For instance, a power supply may generate heat when receiving and/or providing energy. In one or more embodiments, a component of components 310-316 may be a component of components 320-326. For example, the component of components 310-316 may be the same component of components 320-326, in a separate instance. For instance, the component of components 310-316 that is the same component of components 320-326 may be implemented in housing 210A, while the component of components 320-326 may be implemented in housing 210B.

In one or more embodiments, a component of components 310-316 may include one or more structures and/or one or more functionalities of a component of components 320-326. In one or more embodiments, a component of components 320-326 may include one or more structures and/or one or more functionalities of a component of components 310-316. In one or more embodiments, one or more components 310-316 may be utilized while one or more components 320-326 may not be utilized. In one example, the one or more components 320-326 that may not be utilized may be powered down. In another example, the one or more components 320-326 that may not be utilized may be clock gated. For instance, when a component of components 320-326 is clock gated, a clock signal may assigned a constant value, which may suspend one or more logic transitions and/or may cause less power to be consumed. In one or more embodiments, one or more components 320-326 may be utilized while one or more components 310-316 may not be utilized. In one example, the one or more components 310-316 that may not be utilized may be powered down. In another example, the one or more components 310-316 that may not be utilized may be clock gated. For instance, when a component of components 310-316 is clock gated, a clock signal may assigned a constant value, which may suspend one or more logic transitions and/or may cause less power to be consumed.

In one or more embodiments, a component associated with a first housing may include one or more structures and/or functionalities of a component associated with a second housing but have one or more reduced capabilities. For example, component 314 may include one or more structures and/or functionalities of component 324 but have one or more reduced capabilities. In one instance, component 314 may be or include an Intel Atom processor and component 324 may be or include an Intel Core i7 processor. In another instance, component 314 may be or include a first processor that executes a lesser number of instructions per time unit than component 324, which includes a second processor.

In one or more embodiments, an application that may be computationally intensive may utilize a component associated with a first display that has greater capabilities than a component associated with a second display. In one example, applications such as image processing applications, CAD applications, CFD applications, mathematical applications, encryption applications, decryption applications, gaming applications, video processing applications, and/or sound processing applications, among others, may utilize the component associated with the first display that has greater capabilities than the component associated with the second display. In another example, an application that may not be computationally intensive, according to some metric, may utilize the component associated with the second display, which may have lesser capabilities than the component associated with the first display. For instance, applications that may not be computationally intensive may include download applications, word processing applications, spreadsheet applications, email applications, terminal applications, shell applications, and/or monitoring applications, among others.

Figure 4A:
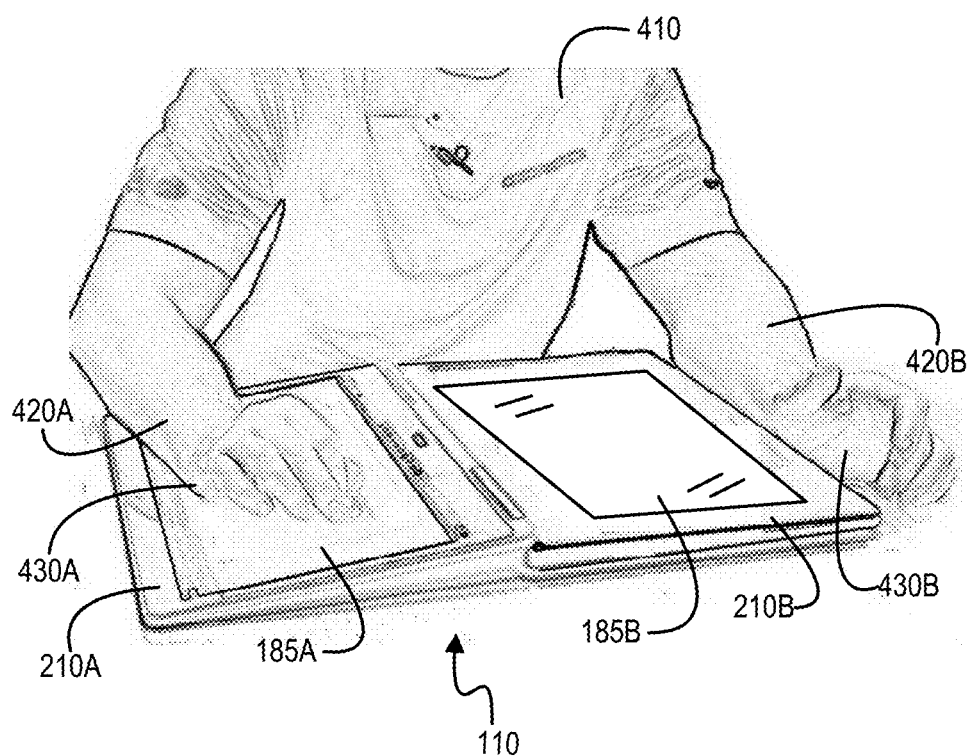
FIG. 4A illustrates an example of a user interacting with an information handling system, according to one or more embodiments.

Turning now to FIG. 4A, an example of a user interacting with an information handling system is illustrated, according to one or more embodiments. As shown, a user 410 may interact with IHS 110. In one or more embodiments, one or more portions of user 410 may be in contact with IHS 110. In one example, as illustrated, a forearm 420A of user 410 may be in contact with IHS 110. In another example, as shown, a forearm 420B of user 410 may not be in contact with IHS 110. As illustrated, forearm 420A of user 410 may be contact with one or more of housing 210A and display 185A.

In one or more embodiments, IHS 110 may determine that one or more portions of user 410 may be in contact with IHS 110. In one example, one or more touch-sensitive elements of IHS 110 may be utilized in determining if one or more portions of user 410 is in contact with IHS 110. In another example, one or more proximity-sensing elements of IHS 110 may be utilized in determining if one or more portions of user 410 is in contact with IHS 110.

Figure 4B:
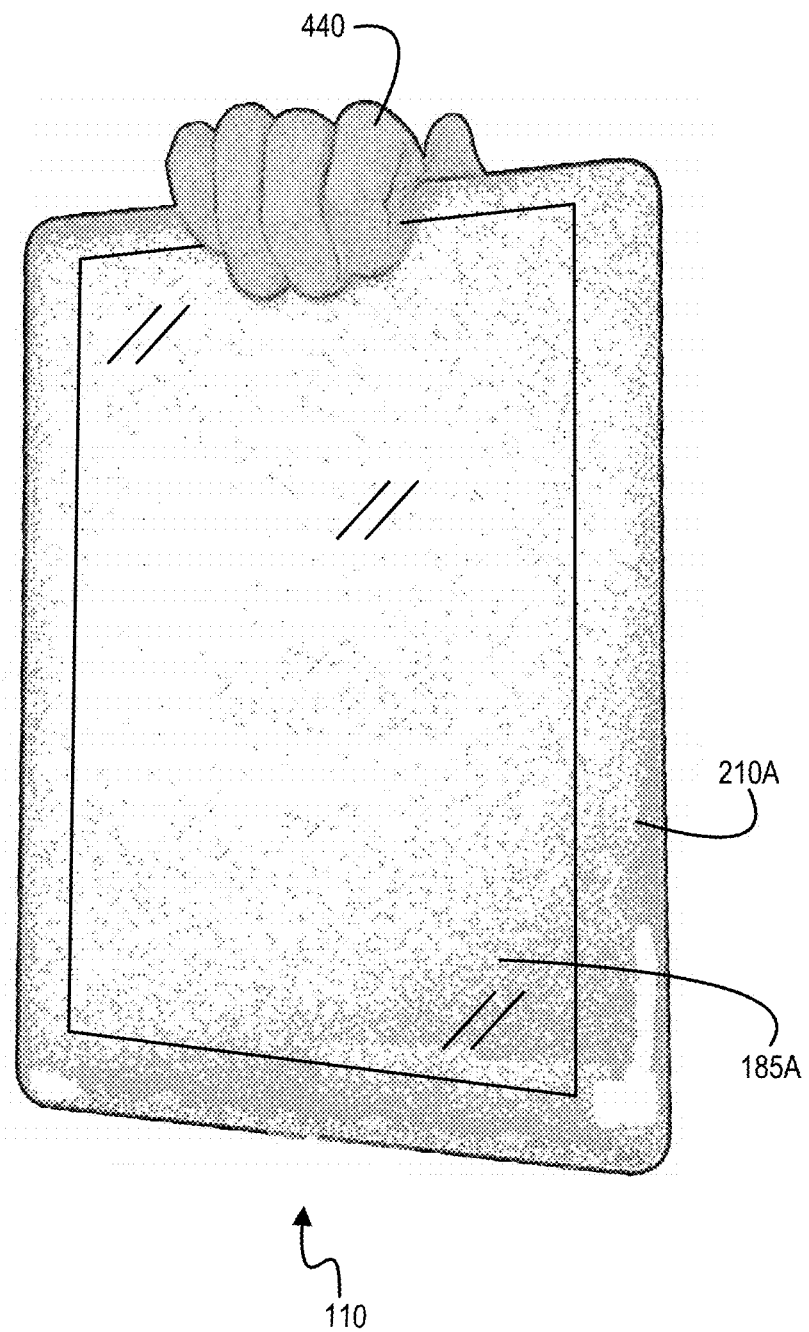
FIG. 4B illustrates an example of holding an information handling system, according to one or more embodiments.

Turning now to FIG. 4B, an example of holding an information handling system is illustrated, according to one or more embodiments. As shown, IHS 110 may be held by at least fingers 440 of a user. As illustrated, fingers 440 may contact display 185A. Although not specifically illustrated, a palm of the user may contact display 185B. For example, the palm of the user may contact display 185B to hold IHS 110. In one or more embodiments, one or more portions of display 185A and/or one or more portions of display 185B may be controlled. For example, one or more portions of display 185A and/or one or more portions of display 185B may be dimmed. For instance, one or more portions of display 185A and/or one or more portions of display 185B may be dimmed where a user contacts the one or more portions of display 185A and/or the one or more portions of display 185B. In one or more embodiments, the user may be in contact with displays 185A and 185B. For example, the user may be in contact with display 185A, as shown in FIG. 4B, and the user may be in contact with display 185B, not specifically shown. For instance, a palm of the user may be in contact with display 185B.

Figure 5:
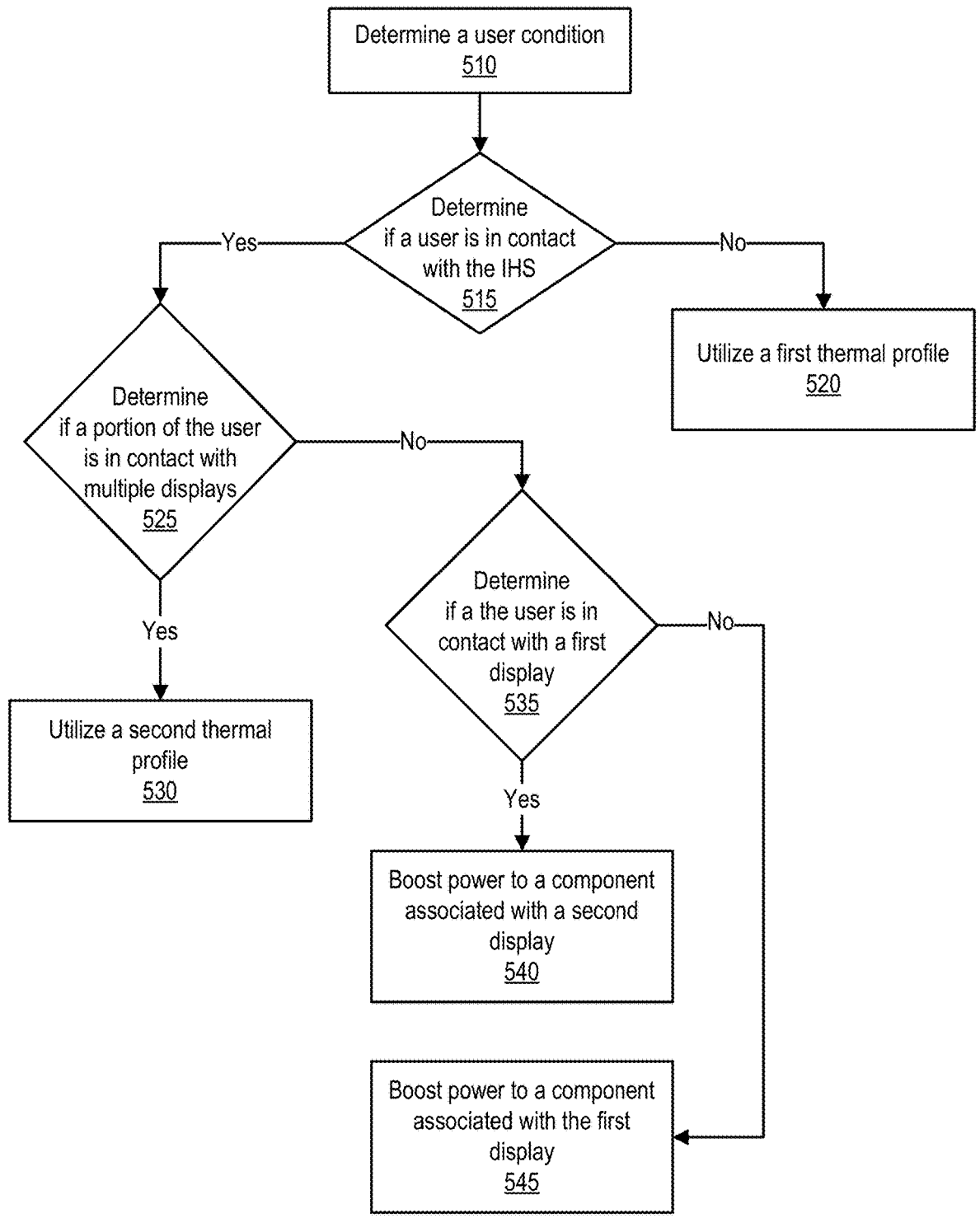
FIG. 5 illustrates a first example of a method of operating an information handling system, according to one or more embodiments.

Turning now to FIG. 5, a first example of a method of operating an information handling system is illustrated, according to one or more embodiments. At 510, a user condition may be determined. In one example, a user condition may include a mode of operation of IHS 110. For instance, the mode of operation may include a laptop mode, a dock mode, a dual screen mode, and a 360 mode, among others. Various modes are illustrated in FIGS. 2A-2K. In another example, a user condition may include an application and/or a tool being utilized. For instance, an application and/or a tool being utilized may include one or more of an on-screen keyboard, an external mouse, a stylus, and an application classification (e.g., a word processing classification, a graphics processing classification, a video processing classification, a sound processing application, etc.), among others.

At 515, it may be determined if a user is in contact with multiple displays of the information handling system. If a user is not in contact with the information handling system, a first thermal profile may be utilized, at 520. For example, the first thermal profile may be or include a non-contact thermal profile. For instance, the first thermal profile may be or include a twenty-two degrees Celsius (22° C.) rise above an ambient temperature. In one or more embodiments, the first thermal profile may boost processing performance of the information handling system.

If the user is in contact with the information handling system, it may be determined if the user is in contact with multiple displays of the information handling system, at 525. For example, it may be determined if the user is in contact with displays 185A and 185B. If the user is in contact with multiple displays of the information handling system, a second thermal profile may be utilized, at 530. For example, the second thermal profile may be or include a contact thermal profile. For instance, the second thermal profile may be or include a twelve degrees Celsius (12° C.) rise above an ambient temperature.

If the user is not in contact with multiple displays of the information handling system, it may be determined of the user is in contact with a first display of the multiple displays, at 535. For example, it may be determined if the user is in contact with display 185A. If the user is in contact with the first display, power to a component associated with a second display may be boosted, 540. For example, the second display may be display 185B, and power to a component of components 320-326 may be boosted. In one instance, the component of components 320-326 may be or include a processor (e.g., processor 120). In another instance, the component of components 320-326 may be or include a GPU (e.g., GPU 190). In one or more embodiments, if the user is interacting with a first display, IHS 110 may boost performance of one or more components associated with a second display. In one or more embodiments, if the user is interacting with the second display, IHS 110 may boost performance of one or more components associated with the first display.

If the user is not in contact with the first display, power to a component associated with the first display may be boosted, at 545. For example, the first display may be display 185A, and power to a component of components 310-316 may be boosted. In one instance, the component of components 310-316 may be or include a processor (e.g., processor 120). In another instance, the component of components 310-316 may be or include a GPU (e.g., GPU 190). In one or more embodiments, boosting power to a component may include one or more of permitting, allowing, and/or configuring the component to produce more heat; permitting, allowing, and/or configuring the component to process additional data per time unit; and permitting, allowing, and/or configuring the component to utilize a faster clock, among others.

Figure 6:
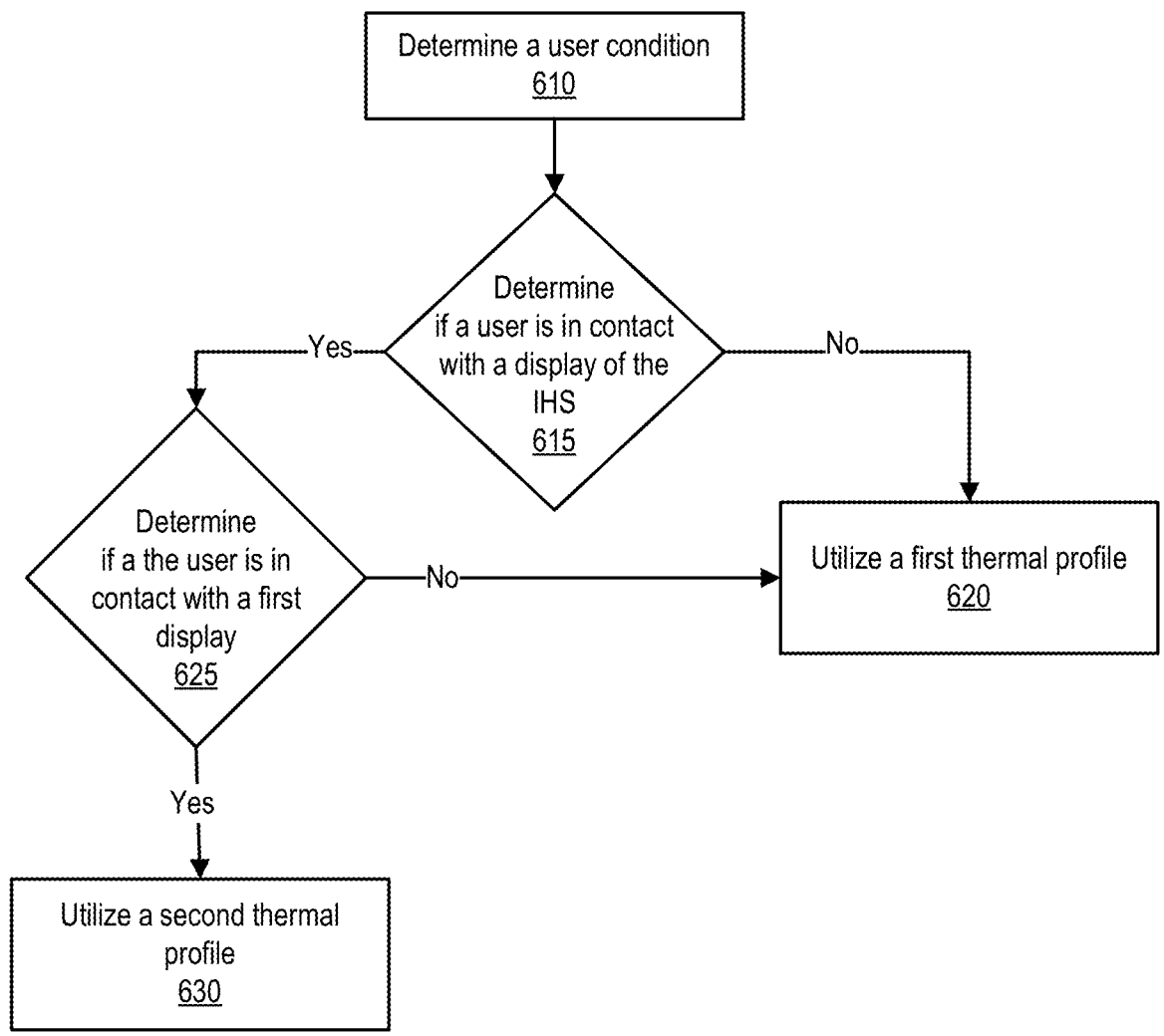
FIG. 6 illustrates a second example of a method of operating an information handling system, according to one or more embodiments.

Turning now to FIG. 6, a second example of a method of operating an information handling system is illustrated, according to one or more embodiments. At 610, a user condition may be determined. In one example, a user condition may include a mode of operation of IHS 110. For instance, the mode of operation may include a laptop mode, a dock mode, a dual screen mode, and a "360" mode, among others. Various modes are illustrated in FIGS. 2A-2K. In another example, a user condition may include an application and/or a tool being utilized. For instance, an application and/or a tool being utilized may include one or more of an on-screen keyboard, an external mouse, a stylus, and an application classification (e.g., a word processing classification, a graphics processing classification, a video processing classification, a sound processing application, etc.), among others. At 615, it may be determined if the user is in contact with a display of the information handling system. For example, it may be determined if the user is in contact with a display of displays 185A and 185B.

If the user is not in contact with a display of the information handling system, a first thermal profile may be utilized, at 620. For example, the first thermal profile may be or include a display non-contact thermal profile. For instance, the first thermal profile may be or include a twenty-two degrees Celsius (22° C.) rise above an ambient temperature. In one or more embodiments, the first thermal profile may boost processing performance of the information handling system. If the user is in contact with a display of the information handling system, it may be determined if the user is in contact with a first display of the information handling system, at 625. If the user is not in contact with the first display of the information handling system, the first thermal profile may be utilized, at 620. For example, the user may be in contact with a second display of the information handling system. In one instance, a battery may be associated with the second display, and the battery may insulate the user from heat from one or more components of associated with the first display. In another instance, a battery may be associated with the second display, and the battery may not produce as much heat as one or more components of associated with the first display.

If the user is in contact with the first display of the information handling system, a second thermal profile may be utilized, at 630. For example, the second thermal profile may be or include a contact thermal profile. For instance, the second thermal profile may be or include a twelve degrees Celsius (12° C.) rise above an ambient temperature.

Figure 7:
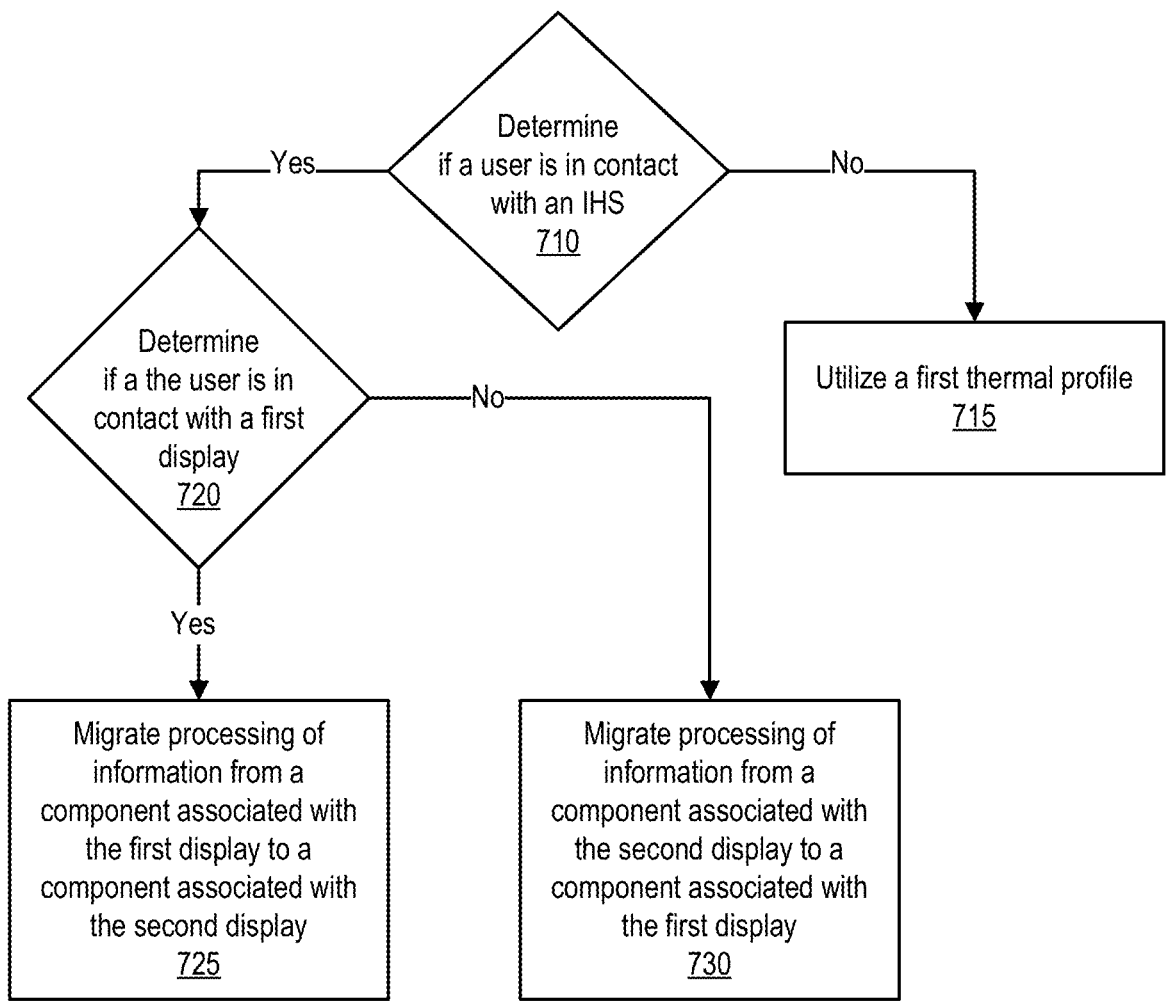
FIG. 7 illustrates another example of a method of operating an information handling system is illustrated, according to one or more embodiments.

Turning now to FIG. 7, another example of a method of operating an information handling system is illustrated, according to one or more embodiments. At 710, it may be determined if a user is in contact with an information handling system. For example, it may be determined if a user is in contact with IHS 110. If the user is not in contact with the information handling system, a first thermal profile may be utilized, at 715. For example, the first thermal profile may be or include a non-contact thermal profile. For instance, the first thermal profile may be or include a twenty-two degrees Celsius (22° C.) rise above an ambient temperature. In one or more embodiments, the first thermal profile may boost processing performance of the information handling system. If the user is in contact with the information handling system, it may be determined if the user is in contact with a first display of a multiple displays of the information handling system, at 720. In one example, the first display may be or include display 185A, and it may be determined if the user is in contact with display 185A. In another example, the first display may be or include display 185B, and it may be determined if the user is in contact with display 185B.

If the user is in contact with the first display, processing of information may be migrated from a component associated with the first display to a component associated with a second display of the multiple displays, at 725. In one example, the first display may be or include display 185A, the second display may be or include display 185B, and processing of information may be migrated from a component associated with display 185A to a component associated with display 185B. In another example, the first display may be or include display 185B, the second display may be or include display 185A, and processing of information may be migrated from a component associated with display 185B to a component associated with display 185A. In one or more embodiments, a second thermal profile may be utilized, if the user is in contact with the first display. For example, the second thermal profile may be or include a contact thermal profile. For instance, the second thermal profile may be or include a twelve degrees Celsius (12° C.) rise above an ambient temperature.

If the user is not in contact with the first display, processing of information may be migrated from a component associated with the second display to a component associated with the first display, at 730. In one example, the second display may be or include display 185B, the first display may be or include display 185A, and processing of information may be migrated from a component associated with display 185B to a component associated with display 185A. In another example, the second display may be or include display 185A, the first display may be or include display 185B, and processing of information may be migrated from a component associated with display 185A to a component associated with display 185B.

In one or more embodiments, it may be determined that the user is in contact with the first display and the second display. For example, multiple pixels at and/or proximate to the contact with at least one of the first display and the second display may be deactivated and/or dimmed in response to determining that the user is in contact with the first display and the second display. For instance, pixels of the first display and/or pixels of the second display may be implemented with light emitting diodes (LEDs). In one or more embodiments, the LEDs may be or include organic light emitting diodes (OLEDs).

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a plurality of displays communicatively coupled to the at least one processor;
   a memory medium that is coupled to the at least one processor and that includes instructions, which when executed by the at least one processor, cause the information handling system to:
   determine if a user is in contact with the information handling system;
   if the user is not in contact with the information handling system, utilize a first thermal profile, the first thermal profile including a first predetermined maximum temperature for a surface of the information handling system;
   if the user is in contact with the information handling system, determine if the user is in contact with a first display of the plurality of displays;
   if the user is in contact with the first display, migrate processing of information from a first processing component associated with the first display to a second processing component associated with a second display of the plurality of displays; and
   if the user is not in contact with the first display, migrate the processing of the information from the second processing component associated with the second display to the first processing component associated with the first display.

2. The information handling system of claim 1, further comprising:
   a graphics processing unit communicatively coupled to the at least one processor;
   wherein the first processing component associated with the first display includes the at least one processor; and
   wherein the second processing component associated with the second display includes the graphics processing unit.

3. The information handling system of claim 2, wherein the graphics processing unit is a discrete graphics processing unit, separate from the at least one processor.

4. The information handling system of claim 1, wherein the instructions further cause the information handling system to:
   if the user is not in contact with the first display, boost power to the first processing component associated with the first display.

5. The information handling system of claim 4, wherein, to boost power to the first processing component associated with the first display, the instructions further cause the information handling system to configure the first processing component associated with the first display to process additional data per time unit.

6. The information handling system of claim 1, wherein the instructions further cause the information handling system to:
   if the user is in contact with the first display, utilize a second thermal profile, the second thermal profile including a second predetermined maximum temperature for a surface of the information handling system.

7. The information handling system of claim 6, wherein the instructions further cause the information handling system to:
   determine that the user is in contact with the first display and the second display; and
   in response to determining that the user is in contact with the first display and the second display, deactivate a plurality of pixels proximate to the contact with at least one of the first display and the second display.

8. A method, comprising:
   determining if a user is in contact with an information handling system;
   if the user is not in contact with the information handling system, utilizing a first thermal profile, the first thermal profile including a first predetermined maximum temperature for a surface of the information handling system;
   if the user is in contact with the information handling system, determining if the user is in contact with a first display of a plurality of displays of the information handling system;
   if the user is in contact with the first display, migrating processing of information from a first processing component associated with the first display to a second processing component associated with a second display of the plurality of displays; and
   if the user is not in contact with the first display, migrating the processing of the information from the second processing component associated with the second display to the first processing component associated with the first display.

9. The method of claim 8,
   wherein the first processing component associated with the first display includes at least one processor of the information handling system; and wherein the second processing component associated with the second display includes a graphics processing unit of the information handling system.

10. The method of claim 9, wherein the graphics processing unit is a discrete graphics processing unit, separate from the processor.

11. The method of claim 8, further comprising:
if the user is not in contact with the first display, boosting power to the first processing component associated with the first display.

12. The method of claim 11, wherein the boosting power to the first processing component associated with the first display includes configuring the first processing component associated with the first display to process additional data per time unit.

13. The method of claim 8, further comprising:
if the user is in contact with the first display, utilizing a second thermal profile, the second thermal profile including a second predetermined maximum temperature for a surface of the information handling system.

14. The method of claim 13, further comprising:
determining that the user is in contact with the first display and the second display; and
in response to the determining that the user is in contact with the first display and the second display, deactivating a plurality of pixels proximate to the contact with at least one of the first display and the second display.

15. A computer-readable non-transitory memory medium that includes instructions that, when executed by at least one processor of an information handling system, cause the information handling system to:
determine if a user is in contact with the information handling system;
if the user is not in contact with the information handling system, utilize a thermal profile, the thermal profile including a predetermined maximum temperature for a surface of the information handling system;
if the user is in contact with the information handling system, determine if the user is in contact with a first display of a plurality of displays of the information handling system;
if the user is in contact with the first display, migrate processing of information from a first processing component associated with the first display to a second processing component associated with a second display of the plurality of displays; and
if the user is not in contact with the first display, migrate the processing of the information from the second processing component associated with the second display to the first processing component associated with the first display.

16. The computer-readable non-transitory memory medium of claim 15,
wherein the first processing component associated with the first display includes the at least one processor; and
wherein the second processing component associated with the second display includes a graphics processing unit of the information handling system.

17. The computer-readable non-transitory memory medium of claim 16, wherein the graphics processing unit is a discrete graphics processing unit, separate from the at least one processor.

18. The computer-readable non-transitory memory medium of claim 15, wherein the instructions further cause the information handling system to:
if the user is not in contact with the first display, boost power to the first processing component associated with the first display.

19. The computer-readable non-transitory memory medium of claim 18, wherein, to boost power to the first processing component associated with the first display, the instructions further cause the information handling system to configure the first processing component associated with the first display to process additional data per time unit.

20. The computer-readable non-transitory memory medium of claim 15, wherein the instructions further cause the information handling system to:
determine that the user is in contact with the first display and the second display; and
in response to determining that the user is in contact with the first display and the second display, deactivate a plurality of pixels proximate to the contact with at least one of the first display and the second display.

* * * * *